United States Patent
Kim et al.

(10) Patent No.: US 10,156,769 B2
(45) Date of Patent: Dec. 18, 2018

(54) TWO-DIMENSIONAL BEAM STEERING DEVICE

(71) Applicant: SAMSUNG ELECTRONICS CO., LTD., Suwon-si (KR)

(72) Inventors: Jungwoo Kim, Hwaseong-si (KR); Changgyun Shin, Anyang-si (KR); Sunil Kim, Osan-si (KR)

(73) Assignee: SAMSUNG ELELCTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/405,853

(22) Filed: Jan. 13, 2017

(65) Prior Publication Data

US 2017/0248830 A1    Aug. 31, 2017

(30) Foreign Application Priority Data

Feb. 26, 2016   (KR) .................. 10-2016-0023647

(51) Int. Cl.
  *G02F 1/29* (2006.01)
  *G02F 1/295* (2006.01)

(52) U.S. Cl.
  CPC ........ *G02F 1/295* (2013.01); *G02F 2001/291* (2013.01); *G02F 2201/121* (2013.01); *G02F 2203/24* (2013.01)

(58) Field of Classification Search
  CPC ...... G02F 1/29; G02F 1/292; G02F 2001/291; B82Y 20/00; G02B 26/005
  USPC ..................... 359/315–318, 322, 323, 298
  See application file for complete search history.

(56) References Cited

U.S. PATENT DOCUMENTS

| | | | |
|---|---|---|---|
| 6,400,855 B1 | 6/2002 | Li et al. | |
| 8,200,055 B2* | 6/2012 | Subbaraman | B82Y 20/00 385/10 |
| 2002/0186919 A1* | 12/2002 | Pepper | G02F 1/011 385/27 |
| 2005/0122566 A1* | 6/2005 | Cicchiello | G02B 5/04 359/298 |
| 2012/0013962 A1 | 1/2012 | Subbaraman et al. | |
| 2012/0206791 A1 | 8/2012 | Pijlman et al. | |
| 2015/0263161 A1 | 9/2015 | Yagishita | |
| 2015/0270683 A1 | 9/2015 | Raab et al. | |
| 2016/0209577 A1* | 7/2016 | Ford | G02B 6/0036 |

OTHER PUBLICATIONS

Jie Sun et al., "Large-scale nanophotonic phased array", Letter, Research Letter, Jan. 10, 2013, vol. 493, Nature, Macmillan Publishers Limited (pp. 195-199), doi:10.1038/nature11727.

(Continued)

*Primary Examiner* — Mohammed Hasan
(74) *Attorney, Agent, or Firm* — Sughrue Mion, PLLC

(57) ABSTRACT

A two-dimensional (2D) beam steering device may include a variable refractive index panel configured to generate a prism effect, a waveguide in contact with a surface of the variable refractive index panel, and an electro-optic prism disposed on a surface of the waveguide. The variable refractive index panel may include a variable refractive index layer, a common electrode layer, and an electrode pattern layer. The common electrode layer and the electrode pattern layer may face each other with the variable refractive index layer therebetween.

9 Claims, 5 Drawing Sheets

(56) References Cited

OTHER PUBLICATIONS

Hsiu-Jen Wang et al., "Electro-Optic Polymer Prism Beam Deflector", WT3 2:30 PM-2:45 PM, Opt. Eng. 48(11), 114601, 2008 IEEE, (pp. 579-580).
Chang-Kun Lee et al., "Analysis and design of wedge projection display system based on ray retracing method", Applied Optics, vol. 52, No. 17, Jun. 10, 2013, Optical Society of America, (pp. 3964-3976) http://dx.doi.org/10.1364/AO.52.003964.
The New York Times., "How an Autonomous Car Gets Around", How an Autonomous Car Gets Around—Graphic—NYTimes.com, Published: Oct. 26, 2012, (2 pages total) http://www.nytimes.com/interactive/2012/10/28/automobiles/how-an-autonomous-car-gets-around.html.

* cited by examiner

TWO-DIMENSIONAL BEAM STEERING DEVICE

CROSS-REFERENCE TO RELATED APPLICATIONS

This application claims priority to Korean Patent Application No. 10-2016-0023647, filed on Feb. 26, 2016, in the Korean Intellectual Property Office, the disclosure of which is incorporated herein in its entirety by reference.

BACKGROUND

1. Field

Apparatuses and methods consistent with the exemplary embodiments relate to a steering device, and more particularly, to a two-dimensional (2D) beam steering device.

2. Description of the Related Art

Three methods have been introduced for steering a laser toward a desired location.

A first method is a method of mechanically rotating a laser source. The laser source may be used as a three-dimensional (3D) image sensor and have a motor therein to rotate the laser source.

A second method is a method of using a bulky electro-optic material.

A third method is an optical phase array (OPA) method which is an optical interference method using a plurality of waveguides and modulators. This method is a beam steering using a pixel array that phase variation is possible.

Mass production of a steering device using the first method has been possible to a degree, but that of steering devices using the second and third methods has been delayed.

SUMMARY

Provided is a two-dimensional (2D) beam steering device which has a small size and a simple structure, and may increase an optical deflection.

Additional aspects will be set forth in part in the description which follows and, in part, will be apparent from the description, or may be learned by practice of the presented embodiments.

According to an exemplary embodiment, a beam steering device may include a variable refractive index panel configured to generate a prism effect, a waveguide in contact with a surface of the variable refractive index panel, and an electro-optic prism disposed on a surface of the waveguide.

In the 2D beam steering device, the variable refractive index panel may include a variable refractive index layer, a common electrode layer, and an electrode pattern layer, in which the common electrode layer and the electrode pattern layer may face each other with the variable refractive index layer therebetween.

The waveguide may have a structure in which a light emission location may vary depending on a light incident location.

A photorefractive material may be disposed on a light emitting surface of the electro-optic prism.

The electrode pattern layer may include a plurality of electrodes that are separate from each other, and the plurality of electrodes may be disposed such that a refractive index distribution is formed in the variable refractive index layer when a voltage is applied to the variable refractive index panel, the refractive index distribution generating a photorefractive index effect equivalent to a structure having two attached prisms with different refractive indices.

The variable refractive index layer may be a liquid crystal layer, a $KTa_{1-x}Nb_xO_3$(KTN) layer, or an NbOx layer.

The waveguide may have a wedge shape.

The photorefractive material may include a lens.

The electro-optic prism may include a plurality of unit prisms.

The electro-optic prism may be disposed such that light emitted from the waveguide is incident on the center of a bottom surface of a unit prism from among the plurality of unit prisms.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
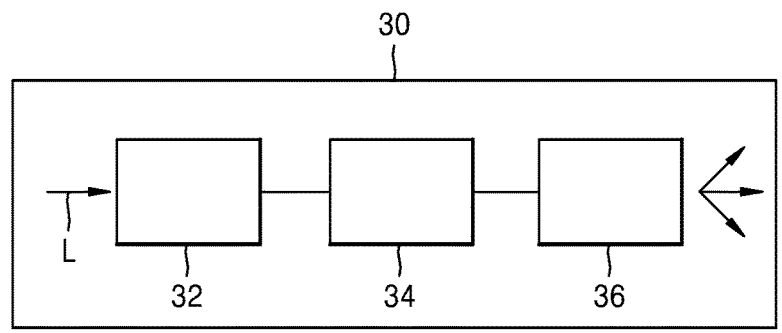
FIG. 1 is a block diagram of a two-dimensional (2D) steering device according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the exemplary embodiments.

Below, a two-dimensional (2D) beam steering device according to an exemplary embodiment will be described in detail with reference to drawings attached. In the description, thicknesses of layers or areas illustrated in drawings may be exaggerated for added clarity.

FIG. 1 is a block diagram of the 2D steering device 30 according to an exemplary embodiment.

Referring to 1, the 2D beam steering device 30 may include a panel 32 representing a variable refractive index prism effect, a waveguide 34, and a light emitting prism 36. The panel 32, the waveguide 34, and the light emitting prism 36 may be optically connected to each other. The panel 32 may include a variable refractive index material. The variable refractive index material may be an electro-optic material in which the refractive index varies depending on an applied voltage. The variable refractive index material may include, for example, liquid crystal, KTN, or NbOx, etc. Thus, a movement path of incident light L incident on the panel 32 may be controlled by adjusting the voltage applied to the panel 32. This denotes that an emission angle of the light L having passed through the panel 32 and leaving the panel 32, that is, a movement direction of the light L may be adjusted and that an incident angle of the light L incident on the waveguide 34 after having passed through the panel 32 may be controlled. The light L may be, for example, a laser. The light L having passed through the panel 32 and being incident on the waveguide 34 may move along the waveguide 34 and be emitted from the waveguide 34 at a certain location of the waveguide 34 in which a certain boundary condition is satisfied. The light L emitted from the waveguide 34 may be incident on the light emitting prism 36. The light emitting prism 36 may be an electro-optic prism. Thus, the refractive index of the light emitting prism 36 may be adjusted by controlling the voltage applied to the light emitting prism 36. Accordingly, the movement path of the light L incident on the light emitting prism 36 from the waveguide 34 may be adjusted and thus, the emission angle of the light L emitted from the light emitting prism 36 may be controlled.

Figure 2:
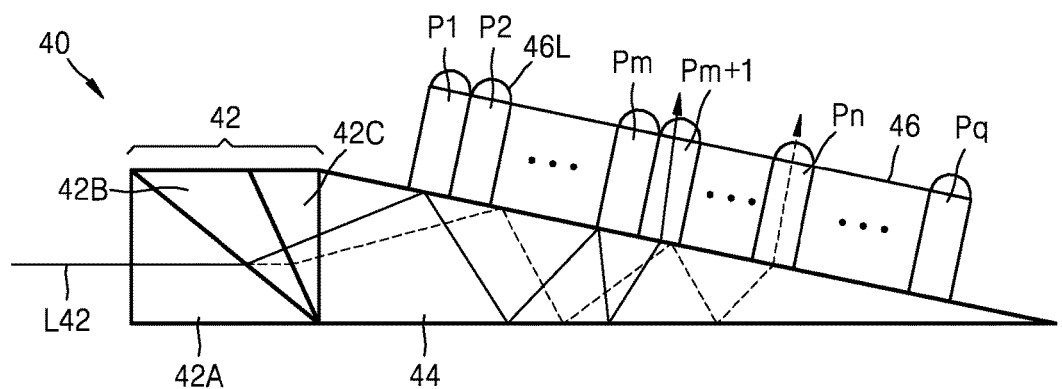
FIG. 2 is a side view of a 2D steering device according to an exemplary embodiment.

FIG. 2 is a side view of a 2D beam steering device 40 according to an exemplary embodiment. FIG. 2 illustrates a detailed example of the 2D beam steering device 30 of FIG. 1.

Referring to FIG. 2, the 2D beam steering device 40 may include a panel 42 representing the variable refractive index prism effect and a waveguide 44 attached to one side thereof. The 2D beam steering device 40 may also include an electro-optic prism 46 disposed on one surface of the waveguide 44. The panel 42 may include a plurality of electrodes 42A, 42B, 42C formed on one side of the panel 42. The plurality of electrodes 42A, 42B, 42C may be configured to form a certain pattern. The plurality of electrodes 42A, 42B, 42C may be disposed such that a variable refractive index layer (for example, 42L in FIG. 3) included in the panel 42 may have a refractive index distribution with a given pattern when a voltage is applied. The waveguide 44 may be a wedge-shaped waveguide (a wedge waveguide). An entrance of the waveguide 44 and a light emitting surface of the panel 42 may contact each other. Accordingly, light emitted from the panel 42 may be incident on the waveguide 44. The electro-optic prism 46 may be disposed on an inclined surface of the waveguide 44. The inclined surface of the waveguide 44 may be the light emitting surface. The electro-optic prism 46 may be disposed such that light emitted through the inclined surface of the waveguide 44 is incident on the electro-optic prism 46. The light incident on the electro-optic prism 46 from the waveguide 44 may pass through the electro-optic prism 46 and be emitted through a surface opposite to an incident surface, that is, an emitting surface. A plurality of lenses 46L may be disposed on emitting surfaces of the electro-optic prism 46. The electro-optic prism 46 may include a plurality of unit prisms P1, P2 ... Pm, Pm+1, ... Pn, ... Pq, (in which m, n, q are 3, 4, 5, ... and q>n>m+1).

The plurality of unit prisms P1, P2 ... Pm, Pm+1, ... Pn, ... Pq may be adhered to each other and may be identical prisms. The plurality of unit prisms P1, P2 ... Pm, Pm+1, ... Pn, ... Pq may be arranged in a row along the inclined surface of the waveguide 44. The lenses 46L may be disposed on respective light emitting surfaces of the plurality of unit prisms P1, P2 ... Pm, Pm+1, ... Pn, ... Pq. The lenses 46L may be a light refraction measure. Light emitted from the electro-optic prism 46 may be focused on a certain area via the lenses 46L.

A method of beam steering of the 2D beam steering device 40 of FIG. 2 will be described.

For example, a first voltage may be applied to the first electrode 42A of the panel 42, and a second voltage may be applied to the second and third electrodes 42B, 42C. The refractive index of the variable refractive index layer of the panel 42 (for example, 42L in FIG. 3) may vary at a boundary of the first electrode 42A and the second electrode 42B via such voltage application. In other words, an area corresponding to the first electrode 42A of the variable refractive index layer 42L may have a first refractive index n1 and areas corresponding to the second and third electrodes 42B, 42C may have a second refractive index n2. Accordingly, light L42 incident on the variable refractive index layer 42L of the panel 42 may be refracted at an area of the variable refractive index layer 42L corresponding to the boundary of the first electrode 42A and the second electrode 42B, and be incident on the waveguide 44 (shown as a solid line). The first refractive index n1 may be different from the second refractive index n2. Depending on a voltage distribution applied to the first through third electrodes 42A, 42B, 42C, the first refractive index n1 may be greater than the second refractive index n2 or vice versa. In addition, areas of the first refractive index n1 and the second refractive index n2 may vary depending on voltages applied to the first through third electrodes 42A, 42B, 42C. For example, when the same voltage is applied to the first and second electrodes 42A, 42B and a different voltage is applied to the third electrode 42C, the area of the second refractive index n2 in the variable refractive index layer 42L may be limited to an area corresponding to the third electrode 42C. In this case, the light L42 incident on the variable refractive index layer 42L of the panel 42 may be refracted in an area corresponding to the boundary of the second and third electrodes 42B, 42C of the variable refractive index layer 42L and enter the waveguide 44 (shown as a dotted line).

Thus, according to a refraction angle of light incident on the panel 42, that is, according to an angle between the incident light L42 and the variable refractive index layer 42L, a location that light L42 reaches the waveguide 44, that is, an incident location (angle) of light L42 incident on the waveguide 44 may vary. When the incident location of the light L42 incident on the waveguide 44 is changed, the emission location of the light L42 on the waveguide 44 may be also changed as illustrated in FIG. 2. Refraction locations of the light L42 incident on the panel 42 may be adjusted via voltage conditions for applying voltages to the first through third electrodes 42A, 42B, 42C. Thus, incident locations of light incident on the waveguide 44 may be adjusted via the voltage conditions applied to the first through third electrodes 42A, 42B, 42C. As a result, emission locations of light emitted from the waveguide 44 may be also adjusted via the voltage conditions applied to the first through third electrodes 42A, 42B, 42C. It may be possible to further segment the refraction location of the incident light L42 by disposing more electrodes than the first through third electrodes 42A, 42B, 42C on the panel 42. Accordingly, incident locations of light incident on the waveguide 44 may be further segmented and emission locations of light emitted from the waveguide 44 may be further segmented. In other words, when more electrodes than the first through third electrodes 42A, 42B, 42C are disposed on the panel 42, emission locations of light emitted from the waveguide 44 may be more finely controlled.

Figure 3:
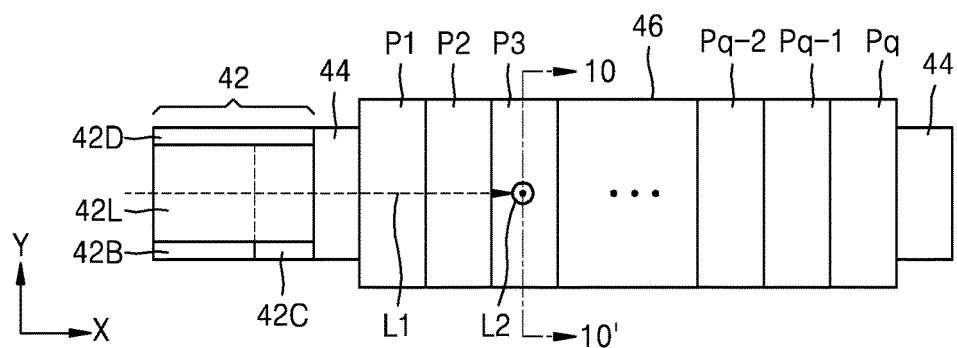
FIG. 3 is a plan view of FIG. 2.

FIG. 3 is a plan view of FIG. 2.

Referring to FIG. 3, the panel 42 may include the variable refractive index layer 42L, the second and third electrodes 42B, 42C, and a fourth electrode 42D. The fourth electrode 42D may be a common electrode with respect to the first through third electrodes 42A, 42B, 42C. The second and third electrodes 42B, 42C may be disposed on a first side of the variable refractive index layer 42L and the fourth electrode 42D may be disposed on a second side of the variable refractive index layer 42L. The second and third electrodes 42B, 42C and the fourth electrode 42D may face each other with the variable refractive index layer 42L therebetween. A width of the waveguide 44 in a y-axis direction may be narrower than that of the electro-optic prism 46 in the y-axis direction; however, it is not limited thereto. A length of the waveguide 44 in an x-axis direction may be longer than that of the electro-optic prism 46 in the x-axis direction.

A reference number L1 in FIG. 3 may indicate light that has passed through the variable refractive index layer 42L of the panel 42 and reached a given incident location of the waveguide 44. In addition, a reference number L2 may indicate light that has reached the given location of the waveguide 44 and be emitted through a given portion of the electro-optic prism 46, for example, through a third prism (P3).

Figure 4:
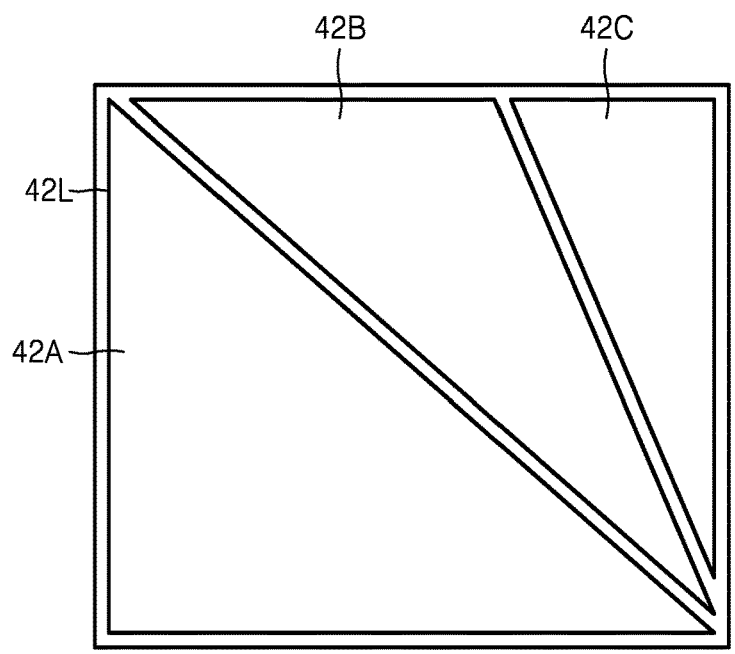
FIG. 4 is a detailed plan view illustrating an arrangement of the first through third electrodes in FIG. 2.

FIG. 4 is a detailed plan view illustrating an arrangement of the first through third electrodes in FIG. 2.

Referring to FIG. 4, the first through third electrodes 42A, 42B, 42C may be separated from each other. The first through third electrodes 42A, 42B, 42C may include a transparent conductive material. For example, the first through third electrodes 42A, 42B, 42C may include indium tin oxide (ITO) electrodes; however, they are not limited thereto. The first through third electrodes 42A, 42B, 42C may be patterned as illustrated in FIG. 4; however, they may be patterned into other shapes also.

Figure 5:
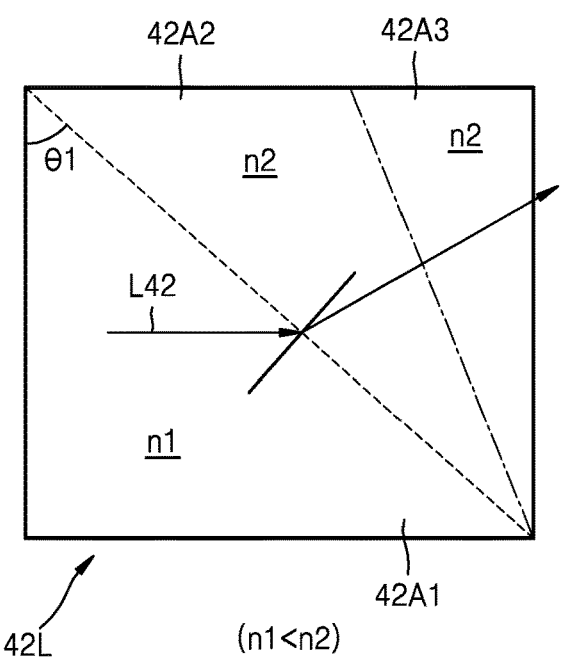
FIG. 5 illustrates a change in a refractive index distribution in a variable refractive index layer (n1<n2) depending on a voltage condition applied to the first through third electrodes in FIG. 4, and subsequent light refraction location.
Figure 6:
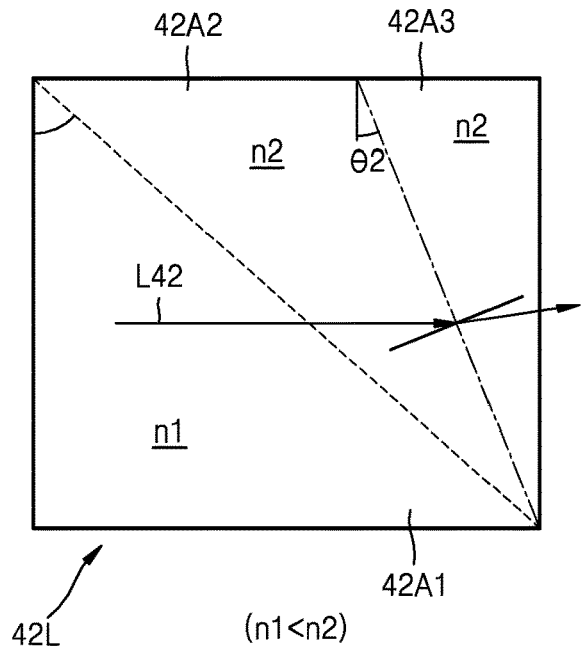
FIG. 6 illustrates a change in the refractive index distribution in a variable refractive index layer (n1<n2) depending on a voltage condition applied to the first through third electrodes in FIG. 4, and subsequent light refraction location.

FIGS. 5 and 6 illustrate changes in refractive index distributions in the variable refractive index layer 42L ($n1<n2$) depending on voltage conditions applied to the first through third electrodes in FIG. 4, and subsequent light refraction locations.

Referring to FIGS. 4 through 6, the same voltage may be applied to the second and third electrodes 42B, 42C and a different voltage may be applied to the first electrode 42A. In this case, the refractive index of a first area 42A1 of the variable refractive index layer 42L may be a first refractive index $n1$ and the refractive index of second and third areas 42A2, 42A3 may be a second refractive index $n2$. The first area 42A1 of the variable refractive index layer 42L may be an area corresponding to the first electrode 42A. The second area 42A2 of the variable refractive index layer 42L may be an area corresponding to the second electrode 42B. The third area 42A3 of the variable refractive index layer 42L may be an area corresponding to the third electrode 42C. As an example of voltages applied to the first through third electrodes 42A, 42B, 42C according to voltage conditions, a voltage may be applied according to a first voltage condition to the first through third electrodes 42A, 42B, 42C, in which the first refractive index $n1$ may be less than the second refractive index $n2$ ($n1<n2$). Accordingly, the light L42 incident on the variable refractive index layer 42L may be upwardly refracted at the boundary of the first area 42A1 and the second area 42A2 as illustrated in FIG. 5. In the variable refractive index layer 42L in FIG. 5, the first area 42A1 may correspond to a prism having the first refractive index $n1$ and the second area 42A2 may correspond to a prism having the second refractive index $n2$.

As a result, the variable refractive index layer 42L in FIG. 5 may have an effect equivalent to a structure in which a prism having the first refractive index $n1$ and a prism having the second refractive index are attached to each other.

The first voltage condition may be a condition that the same voltage is applied to the first and second electrodes 42A, 42B and a different voltage is applied to the third electrode 42C. In this case, as illustrated in FIG. 6, the refractive index of the first and second areas 42A1, 42A2 of the variable refractive index layer 42L may be the first refractive index $n1$, and that of the third area 42A3 may be the second refractive index $n2$. Accordingly, the light L42 incident on the variable refractive index layer 42L may be upwardly refracted at the boundary of the second area 42A2 and the third area 42A3. The variable refractive index layer 42L in FIG. 6 also may have an effect equivalent to a structure in which a prism having the first refractive index $n1$ and a prism having the second refractive index are attached to each other. A simple difference is that the prism configuration illustrated in FIG. 6 may be different from that illustrated in FIG. 5.

In the case of FIGS. 5 and 6, the light L42 incident on the variable refractive index layer 42L may be upwardly refracted, but a refraction angle of the incident light L42 in FIG. 5 is greater than that in FIG. 6. According to FIGS. 5 and 6, as the refraction location of the incident light L42 is closer to one end of the variable refractive index layer 42L, that is, closer to the waveguide 44, corresponding light may be incident on a relatively deeper point of the waveguide 44.

Figure 7:
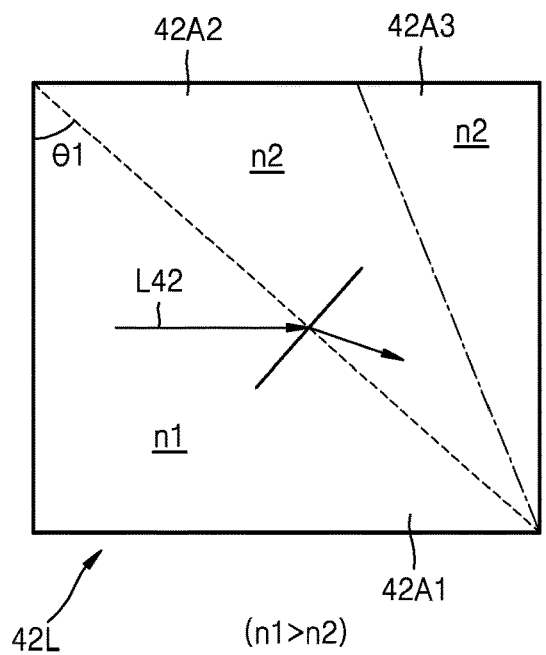
FIG. 7 illustrates a change in the refractive index distribution in a variable refractive index layer (n1>n2) depending on a voltage condition applied to the first through third electrodes in FIG. 4, and subsequent light refraction location.
Figure 8:
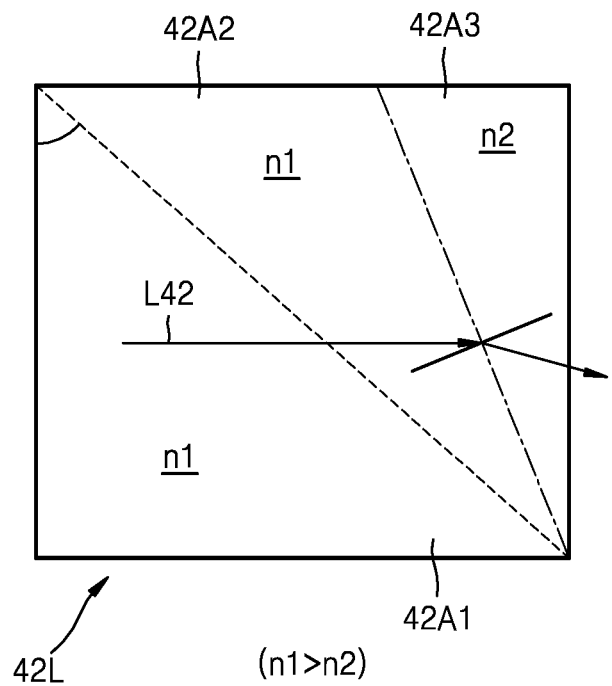
FIG. 8 illustrates a change in the refractive index distribution in a variable refractive index layer (n1>n2) depending on a voltage condition applied to the first through third electrodes in FIG. 4, and subsequent light refraction location.

Voltages having a second voltage condition different from the first voltage condition may be applied to the first through third electrodes 42A, 42B, 42C. According to the first voltage condition and the second voltage condition, voltages of opposite polarities may be respectively applied to a portion and a remaining portion of the first through third electrodes 42A, 42B, 42C. According to the second voltage condition, the first refractive index $n1$ may be greater than the second refractive index $n2$ ($n1>n2$). Accordingly, the refractive index of the second and third areas 42A2, 42A3 may be the second refractive index $n2$, and the refractive index of the first area 42A1 may be the first refractive index $n1$. Under such circumstances, the incident light L42 may be downwardly refracted at the boundary between the first area 42A1 and the second area 42A2, as illustrated in FIG. 7. According to the second voltage condition, as illustrated in FIG. 8, the refractive index of the first and second areas 42A1, 42A2 may be the first refractive index $n1$, and the refractive index of the third area 42A3 may be the second refractive index $n2$. In this situation, the incident light L42 may be downwardly refracted at the boundary between the second area 42A2 and the third area 42A3.

Figure 9:
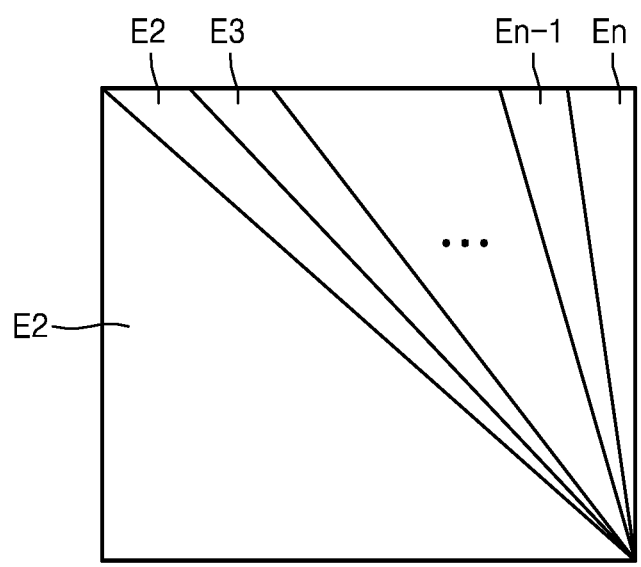
FIG. 9 illustrates an electrode pattern of n electrodes provided on one side of the variable refractive index layer.

In an example described above, the first through third electrodes 42A, 42B, 42C are illustrated as the plurality of electrodes that are disposed on one side surface of the variable refractive index layer 42L; however, more than three electrodes may be disposed on the one side surface. For example, as illustrated in FIG. 9, a first through $n^{th}$ electrodes E1, E2, E3, ... En-1, En (n=5, 6, 7, ...) may be disposed on the one side surface. In this case, the first through $n^{th}$ electrodes E1, E2, E3, ... En-1, En may be separated from each other; however, they are illustrated as adhered to each other for the sake of convenience. The variable refractive index layer 42L may be segmented into areas corresponding to n electrodes E1, E2, E3, ... En-1, En by including n electrodes E1, E2, E3, ... En-1, En. Thus, the refraction location of the incident light L42 incident on the variable refractive index layer 42L may be more finely segmented. The emission location of light emitted from the waveguide 44 may vary depending on the refraction location of the incident light L42 incident on the variable refractive index layer 42L. Thus, the light emission location from the waveguide 44 may be finely adjusted via fine segmentation of the refraction location of incident light L42 incident on the variable refractive index layer 42L.

The incident light L42 may be a laser. The emission location of the laser from the waveguide 44 may be finely adjusted via fine segmentation of the refraction location of the incident light L42 incident on the variable refractive index layer 42L by disposing the plurality of electrodes on one side surface of the variable refractive index layer 42L. The electro-optic prism 46 may be disposed on the inclined surface of the waveguide 44. Thus, a fine segmentation of the refraction location of the light L42 incident on the variable refractive index layer 42L indicates that the incident location of the laser incident on the electro-optic prism 46 may be finely controlled via the waveguide 44. Accordingly, the laser emitted through the inclined surface of the waveguide 44 may be controlled to be incident on the center of a bottom surface of a certain unit prism (for example, Pm+1 or Pn in FIG. 2) of the electro-optic prism 46. The electro-optic prism 46 may be disposed such that light emitted from the waveguide 44 is incident on the center of the bottom surface of the unit prism.

Figure 10:
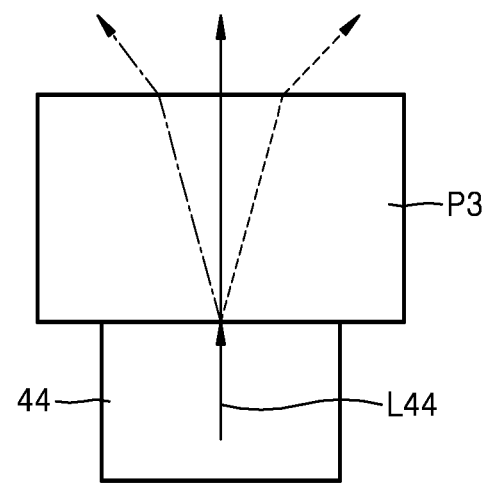
FIG. 10 is a cross-sectional view of FIG. 3, cut along a line 10-10'.

FIG. 10 is a cross-sectional view of FIG. 3, cut along a line 10-10'.

Referring to FIG. 10, a third unit prism P3 may be disposed on the waveguide 44. The light L44 (may be the laser) incident on the third unit prism P3 from the waveguide 44 may have the movement direction changed depending on the voltage condition applied to the third prism P3. For example, depending on the voltage condition applied to the third unit prism P3, the light L44 may pass through the third unit prism P3 without refraction and be emitted outside, or may be refracted either leftwardly or rightwardly and emitted outside. This result denotes that the laser incident on each unit prism may be irradiated from side to side by adjusting the voltage applied to the electro-optic prism 46.

As a result, the emission location of light emitted from the waveguide 44 may be controlled by adjusting the voltage applied to the variable refractive index layer 42L, and the emitting direction of light emitted from the electro-optic prism 46 may be controlled from side to side by adjusting the voltage applied to the electro-optic prism 46. Accordingly, a 2D scanning using the laser may be possible by controlling voltages applied to the variable refractive index layer 42L and to the electro-optic prism 46.

Figure 11:
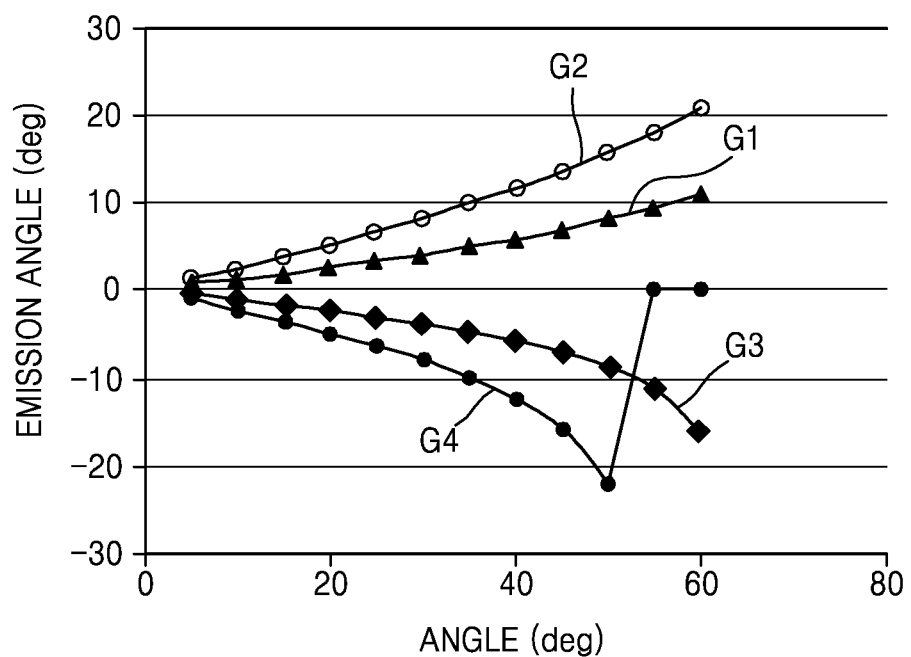
FIG. 11 is a graph illustrating emission angles of light emitted from the variable refractive index layer depending on refraction locations of light incident on the variable refractive index layer of the 2D beam steering device according to an exemplary embodiment.

FIG. 11 is a graph illustrating emission angles of light emitted from the variable refractive index layer 42L depending on refraction locations of light incident on the variable refractive index layer 42L of the 2D beam steering device according to an embodiment.

In FIG. 11, a horizontal axis may denote angles of the refractive index boundary surface (for example, θ1 in FIG. 5 and θ2 in FIG. 6) at refraction locations of light, and a vertical axis may denote emission angles of light emitted from the variable refractive index layer 42L.

In FIG. 11, first and second graph lines G1 and G2 may show, as described in FIGS. 5 and 6, first and second results measured at the first voltage condition, in which light is upwardly refracted, at the refraction location. Third and fourth graph lines G3 and G4 may show, as described in FIGS. 7 and 8, first and second results measured at the second voltage condition, in which light is downwardly refracted, at the refraction location.

Referring to FIG. 11, as the angle of the refractive index boundary surface increases, that is, as the refraction location moves farther away from the waveguide 44, the emitting angle of light emitted from the variable refractive index layer 42L also increases, and it will be understood that the emitting angle may increase by about 10° or more.

The 2D beam steering device according to an exemplary embodiments may include the variable refractive index panel representing the prism effect, a waveguide in which the emission location of light varies depending on the incident location of light, and the electro-optic prism capable of controlling the emitting direction of light which is from the waveguide and be incident thereon; and with this configuration, the 2D beam steering device may reduce the number of components, when compared with devices with a conventional mechanical method, by controlling voltages applied to the variable refractive index panel and the electro-optic prism, and may reduce an overall volume thereof.

In addition, when the 2D beam steering device is used, the 2D beam scanning may be possible via a single light source (the laser). In addition, the optical deflection angle may increase via the wedge-shaped waveguide.

The 2D beam steering device according to the exemplary embodiments may be applicable to a display scanning the laser in a 2D space, a sensor, a medical area, and especially, to a projection display, a light detection and ranging (LiDAR) sensor aimed for an automotive application.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A two-dimensional (2D) beam steering device, the device comprising: a variable refractive index panel configured to generate a prism effect; a waveguide in contact with a surface of the variable refractive index panel; and an electro-optic prism disposed on a surface of the waveguide,
   wherein the electro-optic prism comprises a plurality of unit prisms and the electro-optic prism is disposed such that light emitted from the waveguide is incident on a given area of a bottom surface of a unit prism from among the plurality of unit prisms.

2. The beam steering device of claim 1, wherein the variable refractive index panel comprises:

a variable refractive index layer;
a common electrode layer; and
an electrode pattern layer,
 wherein the common electrode layer and the electrode pattern layer face each other with the variable refractive index layer therebetween.

3. The beam steering device of claim 2, wherein the electrode pattern layer comprises a plurality of electrodes that are separated from each other, and
 wherein the plurality of electrodes are disposed such that a refractive index distribution is formed in the variable refractive index layer when a voltage is applied to the variable refractive index panel, the refractive index distribution generating a photorefractive effect equivalent to a structure having two attached prisms with different refractive indices.

4. The beam steering device of claim 3, wherein the waveguide comprises a wedge shape.

5. The beam steering device of claim 4, wherein the photorefractive material comprises a lens.

6. The beam steering device of claim 2, wherein the variable refractive index layer comprises a liquid crystal layer, a $KTa_{1-x}Nb_xO_3$ (KTN) layer, or an $NbO_x$ layer.

7. The beam steering device of claim 1, wherein the waveguide comprises a structure such that a location of the waveguide from which light is emitted varies depending on an incident location of the light.

8. The beam steering device of claim 1, wherein a photorefractive material is disposed on a light emitting surface of the electro-optic prism.

9. The beam steering device of claim 1, wherein the given area of the bottom surface of the unit prism from among the plurality of unit prisms is a center of the bottom surface of the unit prism from among the plurality of unit prisms.

* * * * *